US008830849B2

(12) United States Patent
Gaal et al.

(10) Patent No.: US 8,830,849 B2
(45) Date of Patent: Sep. 9, 2014

(54) METHOD AND APPARATUS FOR DETECTING TRANSMISSION SIGNALS

(75) Inventors: Peter Gaal, San Diego, CA (US); Ravi Palanki, San Diego, CA (US); Valentin Alexandru Gheorghiu, Tokyo (JP); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 13/004,011

(22) Filed: Jan. 10, 2011

(65) Prior Publication Data

US 2011/0170440 A1 Jul. 14, 2011

Related U.S. Application Data

(60) Provisional application No. 61/294,035, filed on Jan. 11, 2010.

(51) Int. Cl.
*H04W 24/00* (2009.01)
*H04B 7/00* (2006.01)
*H04W 72/08* (2009.01)
*H04W 64/00* (2009.01)
*H04W 74/08* (2009.01)

(52) U.S. Cl.
CPC ............ *H04W 72/082* (2013.01); *H04W 64/00* (2013.01); *H04W 74/0866* (2013.01)
USPC .............................. 370/252; 455/450; 455/522

(58) Field of Classification Search
CPC ............ H04W 52/146; H04W 72/082; H04W 74/0866; H04W 88/02; H04W 52/242; H04W 64/00

USPC .......................................... 370/252; 455/522
See application file for complete search history.

(56) References Cited

U.S. PATENT DOCUMENTS

| | | | |
|---|---|---|---|
| 7,778,151 B2 * | 8/2010 | Bertrand et al. ............. 370/208 |
| 7,933,566 B2 * | 4/2011 | Li et al. ...................... 455/115.1 |
| 8,315,148 B2 * | 11/2012 | Lipka et al. .................. 370/203 |
| 2004/0062218 A1 | 4/2004 | Ue |
| 2008/0261645 A1 * | 10/2008 | Luo et al. ..................... 455/522 |
| 2008/0267303 A1 * | 10/2008 | Baldemair et al. ........... 375/260 |

(Continued)

FOREIGN PATENT DOCUMENTS

| | | |
|---|---|---|
| CN | 1195435 A | 10/1998 |
| WO | 2009099813 A1 | 8/2009 |

(Continued)

OTHER PUBLICATIONS

International Search Report and Written Opinion—PCT/US2011/020887, International Search Authority—European Patent Office—Apr. 1, 2011.

(Continued)

*Primary Examiner* — Edan Orgad
*Assistant Examiner* — Emmanuel Maglo
(74) *Attorney, Agent, or Firm* — Larry Moskowitz (57) ABSTRACT

Certain aspects of the present disclosure provide methods, apparatus, and computer-program products for the detection of potentially interfering user equipment (UE) in the proximity of a detecting entity. The detecting entity may be a base station or a UE. The detecting entity may take one or more actions in response to the detection in an effort to mitigate interference.

32 Claims, 5 Drawing Sheets

(56) References Cited

U.S. PATENT DOCUMENTS

| | | |
|---|---|---|
| 2009/0197631 A1 | 8/2009 | Palanki et al. |
| 2009/0225741 A1* | 9/2009 | Wang et al. .................. 370/345 |
| 2009/0252077 A1* | 10/2009 | Khandekar et al. ........... 370/312 |
| 2009/0325626 A1* | 12/2009 | Palanki et al. ................ 455/522 |
| 2010/0008282 A1* | 1/2010 | Bhattad et al. ................ 370/312 |
| 2010/0056197 A1* | 3/2010 | Attar et al. .................... 455/522 |
| 2010/0074130 A1* | 3/2010 | Bertrand et al. .............. 370/252 |
| 2010/0206154 A1* | 8/2010 | Aletto et al. .................... 84/329 |
| 2010/0216470 A1 | 8/2010 | Pamp et al. |
| 2010/0238888 A1 | 9/2010 | Sampath et al. |
| 2011/0044269 A1 | 2/2011 | Fan et al. |
| 2011/0151907 A1 | 6/2011 | Oh et al. |
| 2011/0235602 A1 | 9/2011 | Ji et al. |
| 2012/0142364 A1 | 6/2012 | Duan |
| 2012/0243503 A1 | 9/2012 | Mochida |
| 2013/0114450 A1 | 5/2013 | Xu et al. |

FOREIGN PATENT DOCUMENTS

| | | |
|---|---|---|
| WO | WO2009121010 A2 | 10/2009 |
| WO | WO2009155967 A1 | 12/2009 |
| WO | 2011021387 A1 | 2/2011 |
| WO | 2011090028 A1 | 7/2011 |

OTHER PUBLICATIONS picoChip Designs, Text Proposal for TR36.9xx: Victim UE Aware Interference Management, 3GPP TSG-RAN WG4 Meeting #53 R4-094821, Nov. 2009, URL, http://www.3gpp.org/ftp/tsg_ran/wg4_radio/TSGR4_53/Documents/R4-094821.zip.

picoChip Designs, Victim UE Aware Downlink Interference Management, 3GPP TSG-RAN WG4 Meeting #52bis R4-093668, Oct. 12, 2009, URL, http://www.3gpp.org/ftp/tsg_ran/wg4_radio/TSGR4_52bis/Documents/R4-093668.zip.

picoChip Designs, Victim UE Aware Downlink Interference Management, 3GPP TSG-RAN WG4 Meeting #53 R4-094367, Nov. 9, 2009, URL, http://www.3gpp.org/ftp/tsg_ran/wg4_radio/TSGR4_53/Documents/R4-094367.zip.

* cited by examiner

METHOD AND APPARATUS FOR DETECTING TRANSMISSION SIGNALS

CLAIM OF PRIORITY UNDER 35 U.S.C. §119

The present application for patent claims priority to U.S. Provisional Application No. 61/294,035, entitled, "METHOD AND APPARATUS FOR DETECTING TRANSMISSION SIGNALS," filed Jan. 11, 2010, and assigned to the assignee hereof and expressly incorporated herein by reference.

BACKGROUND

1. Field of the Invention

The present disclosure relates generally to communication, and more specifically to interference control in wireless networks.

2. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data to one or more UEs on the downlink and may receive data from one or more UEs on the uplink. On the downlink, a data transmission from the base station may observe interference due to data transmissions from neighbor base stations. On the uplink, a data transmission from a UE may observe interference due to data transmissions from other UEs communicating with the neighbor base stations. For both the downlink and uplink, the interference due to the interfering base stations and the interfering UEs may degrade performance.

SUMMARY

Certain aspects of the present disclosure provide a method for wireless communications. The method generally includes monitoring for transmissions of a potentially dominant interferer user equipment (UE), processing the monitored transmissions to determine whether potentially dominant interferer UE is in proximity, and taking one or more actions in response to determining a potentially dominant interferer UE is in proximity.

Certain aspects of the present disclosure provide an apparatus for wireless communications. The apparatus generally includes means for monitoring for transmissions of a potentially dominant interferer user equipment (UE), means for processing the monitored transmissions to determine whether potentially dominant interferer UE is in proximity, and means for taking one or more actions in response to determining a potentially dominant interferer UE is in proximity.

Certain aspects of the present disclosure provide an apparatus for wireless communications. The apparatus generally includes at least one processor configured to monitor for transmissions of a potentially dominant interferer user equipment (UE), process the monitored transmissions to determine whether potentially dominant interferer UE is in proximity, and take one or more actions in response to determining a potentially dominant interferer UE is in proximity; and a memory coupled with the at least one processor.

Certain aspects of the present disclosure provide a computer-program product comprising a computer-readable medium with instructions stored thereon. The instructions generally executable by a processor for monitoring for transmissions of a potentially dominant interferer user equipment (UE), processing the monitored transmissions to determine whether potentially dominant interferer UE is in proximity, and taking one or more actions in response to determining a potentially dominant interferer UE is in proximity.

DETAILED DESCRIPTION

Various aspects are now described with reference to the drawings. In the following description, for purposes of explanation, numerous specific details are set forth in order to provide a thorough understanding of one or more aspects. It will be recognized, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an eNodeB (eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization has similar performance and essentially the same overall complexity as those of OFDMA system. SC-FDMA signal has lower peak-to-average power ratio (PAPR) because of its inherent single carrier structure. SC-FDMA has drawn great attention, especially in uplink communications where lower PAPR benefits the mobile terminal in terms of transmit power efficiency.

Figure 1:
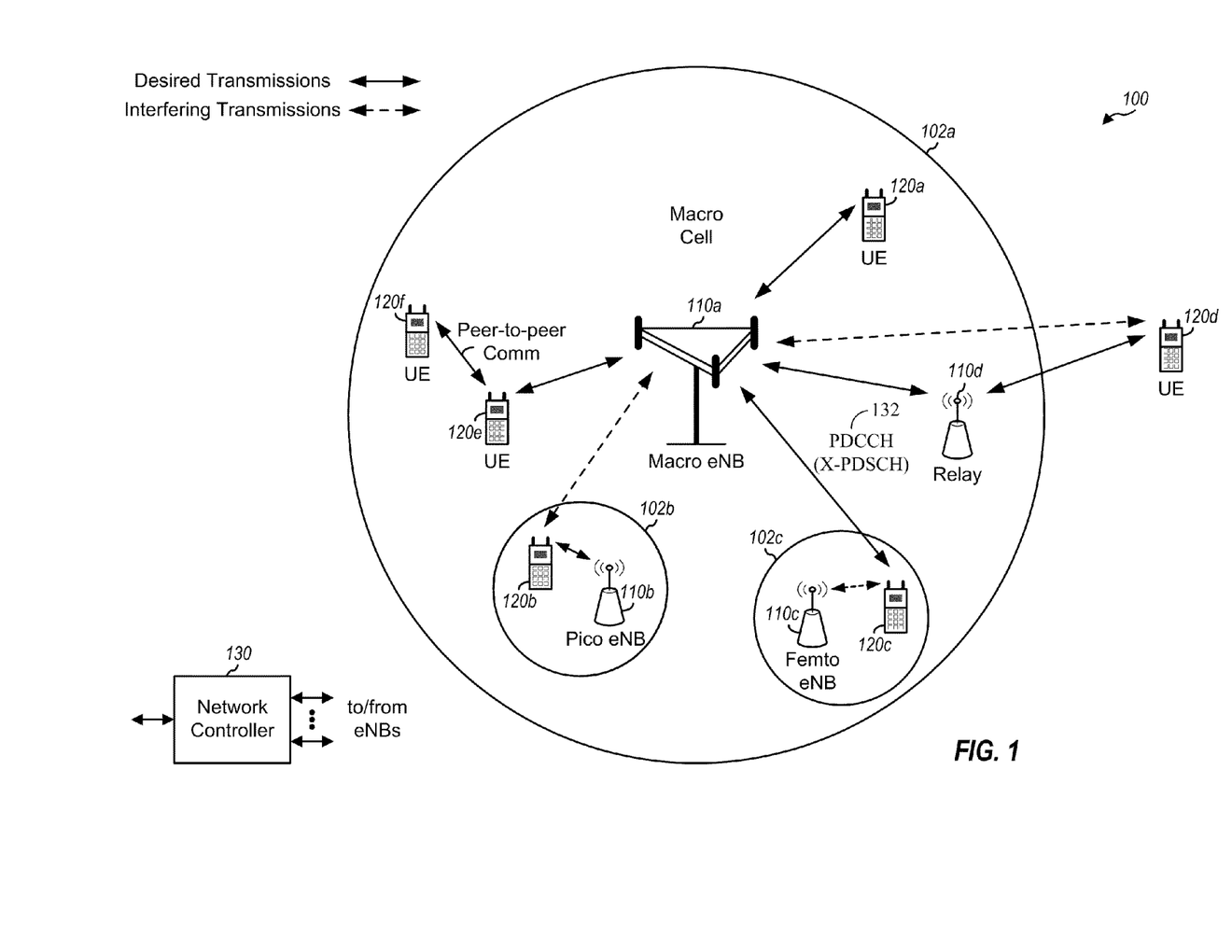
FIG. 1 illustrates an example heterogeneous wireless communications network, in accordance with certain aspects of the present disclosure.

FIG. 1 illustrates an example heterogeneous wireless network 100, in which various aspects of the present disclosure may be practiced.

The wireless communication network 100 may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a home eNB (HeNB) or a femto eNB. In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station", and "cell" may be used interchangeably herein.

Wireless network 100 may also include relays. A relay may be an entity that can receive a transmission of data from an upstream station (e.g., an eNB or a UE) and send a transmission of the data to a downstream station (e.g., a UE or an eNB). A relay may also be a UE that can relay transmissions for other UEs. In the example shown in FIG. 1, a relay 110d may communicate with macro eNB 110a via a backhaul link and with a UE 120d via an access link in order to facilitate communication between eNB 110a and UE 120d. A relay may also be referred to as a relay eNB, a relay station, a relay base station, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage sizes, and different impact on interference in wireless network 100. For example, macro eNBs may have a high transmit power level (e.g., 5 to 40 Watts) whereas pico eNBs, femto eNBs, and relays may have lower transmit power levels (e.g., 0.1 to 2 Watts).

A network controller 130 may couple to a set of eNBs and may provide coordination and control for these eNBs. Network controller 130 may comprise a single network entity or a collection of network entities. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with macro eNBs, pico eNBs, femto eNBs, relays, etc. A UE may also be able to communicate peer-to-peer (P2P) with another UE. In the example shown in FIG. 1, UEs 120e and 120f may communicate directly with each other without communicating with an eNB in wireless network 100. P2P communication may reduce the load on wireless network 100 for local communications between UEs. P2P communication between UEs may also allow one UE to act as a relay for another UE, thereby enabling the other UE to connect to an eNB.

In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

A UE may be located within the coverage of multiple eNBs. One of these eNBs may be selected to serve the UE. The serving eNB may be selected based on various criteria such as received signal strength, received signal quality, pathloss, membership in a subscriber group, and the like. Received signal quality may be quantified by a signal-to-noise-and-interference ratio (SINR), or a reference signal received quality (RSRQ), or some other metric.

A UE may operate in a dominant interference scenario in which the UE may observe high interference from one or more interfering eNBs. A dominant interference scenario may occur due to restricted association. For example, in FIG. 1, UE 120c may be close to femto eNB 110c and may have high received power for eNB 110c. However, UE 120c may not be able to access femto eNB 110c due to restricted association and may then connect to macro eNB 110a with lower received power. UE 120c may then observe high interference from femto eNB 110c on the downlink and may also cause high interference to femto eNB 110c on the uplink.

A dominant interference scenario may also occur due to range extension, which is a scenario in which a UE connects to an eNB with lower pathloss and possibly lower SINR among all eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. This may result in less interference to the wireless network for a given data rate for UE 120b.

Various interference management techniques may be used to support communication in a dominant interference scenario. These interference management techniques may include semi-static resource partitioning (which may be referred to as inter-cell interference coordination (ICIC)), dynamic resource allocation, interference cancellation, etc. Semi-static resource partitioning may be performed (e.g., via backhaul negotiation) to allocate resources to different cells. The resources may comprise subframes, subbands, carriers, resource blocks, transmit power, etc. Each cell may be allocated a set of resources that may observe little or no interference from other cells or their UEs. Dynamic resource allocation may also be performed (e.g., via exchange of over-the-air messages between cells and UEs) to allocate resources as needed to support communication for UEs observing strong interference on the downlink and/or uplink. Interference cancellation may also be performed by UEs to mitigate interference from interfering cells.

Wireless network 100 may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single HARQ interlace, which may include every Q-th subframes, where Q may be equal to 4, 6, 8, 10, or some other value. For asynchronous HARQ, each transmission of the packet may be sent in any subframe, subject to a minimum delay from the previous transmission of the same packet.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 100 may utilize FDD or TDD. For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods.

Figure 2:
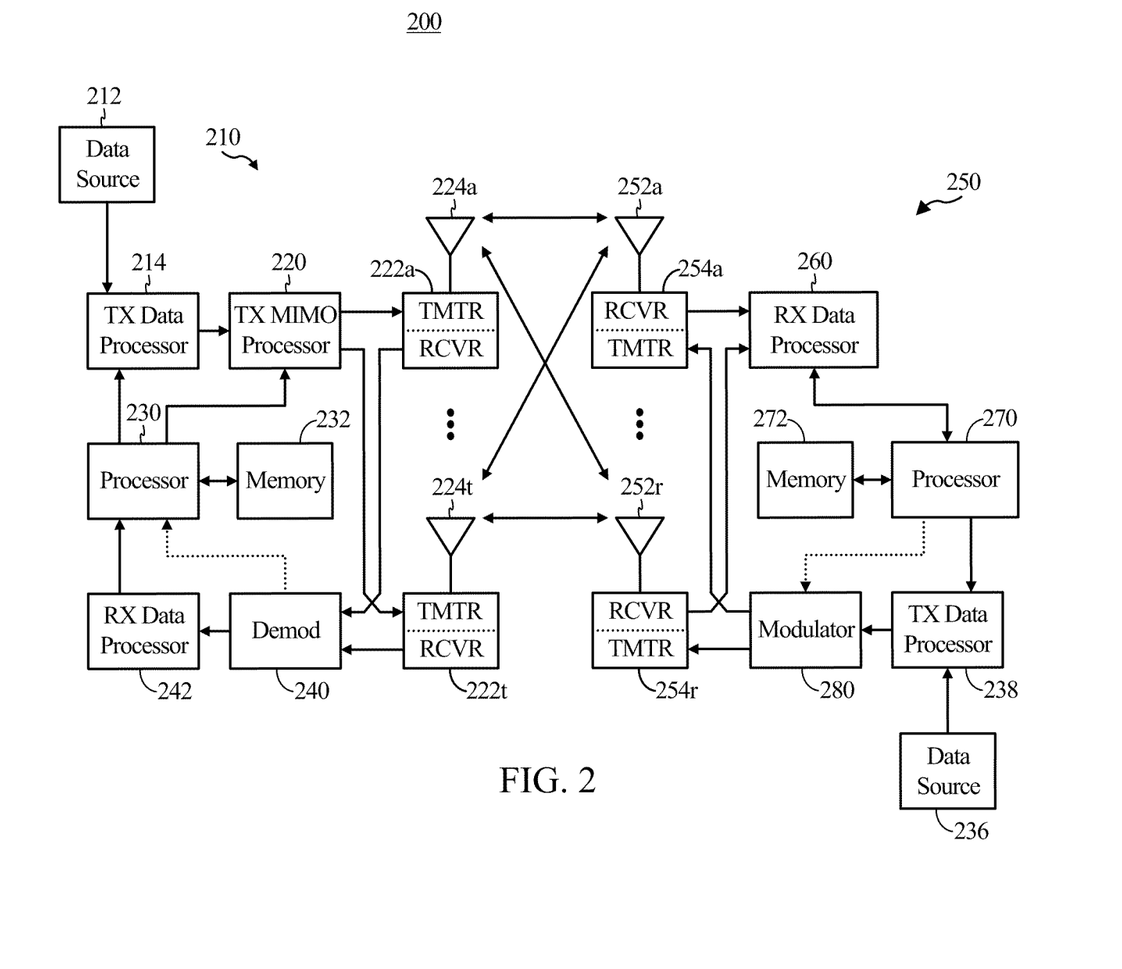
FIG. 2 illustrates a block diagram of example components of an access point and access terminal, in accordance with certain aspects of the present disclosure.

FIG. 2 is a block diagram 200 showing example components of an exemplary base station 210 and access terminal 250 in an example wireless system 200. The base station 210 can be an access point or eNB such as one of the eNBs 110 illustrated in FIG. 1 and the access terminal 250 can be a user equipment such as one of the UEs 120 illustrated in FIG. 1.

At the base station 210, traffic data for a number of data streams is provided from a data source 212 to a transmit (TX) data processor 214. A processor 230 may generate control information to be transmitted to the AT 250.

A TX data processor 214 formats, codes, and interleaves the traffic data for each data stream based on a particular coding scheme selected for that data stream to provide coded data. The coded data for the data streams and control information may be multiplexed with pilot data using OFDM techniques.

The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M is generally a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Transmitters 222 receive and process symbol streams for each downlink component carrier to provide one or more analog signals, and further condition (e.g., amplify filter, and upconvert) the analog signals to provide a modulated signal suitable for transmission over the MIMO channel. $N_T$ modulated signals from transmitters 222a through 222t are then transmitted from $N_T$ antennas 224a through 224t, respectively.

At the access terminal 250, the transmitted modulated signals for the downlink component carriers are received by $N_R$ antennas 252a through 252r and the received signal from each antenna 252 is provided to a respective receiver (RCVR) of the receivers 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream for each configured component carrier to recover the traffic data and control information, for example, including PDSCH and broadcast signals (which may be protected by careful resource allocation in potentially interfering cells as described herein).

The processing by RX data processor 260 may be complementary to that performed by TX MIMO processor 220 and TX data processor 214 at transmitter system 210. A processor 270, coupled to a memory 272, periodically determines which pre-coding matrix to use. Processor 270 formulates an uplink message comprising a matrix index portion and a rank value portion.

An uplink (reverse link) message may comprise various types of information regarding the communication link and/or the received data stream. The uplink message may then processed by a TX data processor 238, which also receives traffic data for a number of data streams from a data source 236, modulated by a modulator 280, conditioned by transmitters 254a through 254r.

At transmitter system 210, the uplink transmissions from access terminal 250 are received by antennas 224, conditioned by receivers 222, demodulated by a demodulator 240 and processed by a RX data processor 242 to extract the reserve link message transmitted by the receiver system 250. Processor 230 can then determine various parameters, such as which pre-coding matrix to use for determining beamforming weights, and continue processing the extracted message.

Method and Apparatus for Detecting Transmission Signals

In conventional wireless systems, UEs are typically connected to the closest base station in order to maximize downlink (DL) and uplink (UL) SNR and to minimize near-far effects. However in certain networks, such as when base stations with closed subscriber groups (CSG) are deployed, a UE may not be allowed to connect to the closest base station (e.g., assuming it is not a member of the CSG). This may result in serious interference scenarios when a mobile station is connected to a more distant base station while in close proximity to a CSG base station.

Certain aspects of the present disclosure may help mitigate interference under these conditions by providing mechanisms whereby a base station may become aware of UEs that are in its proximity, but not connected to it. As will be described in detail below, various different techniques may be employed for such proximity detection. Once a potentially interferer UE is detected, various actions may be taken in an effort to mitigate interference with transmissions therefrom.

Because UEs in idle mode do not transmit, their location may not be readily detected by observing the UL signal in idle mode. In other words, the UEs may only be detected with UE assistance, when UE transmissions are initiated upon the UE detecting the presence of a nearby CSG base station. That transmission may be an indication to a serving cell which, in turn, may inform the CSG cell through a backhaul (wire line or wireless). As an alternative, the CSG may detect the UE transmission directly, which may be applicable, particularly to the case of detecting connected mode UEs.

Certain aspects will be described below with reference to a base station (e.g., an eNB of a CSG) performing such proximity detection and interference mitigation. However, those skilled in the art will recognize that similar operations may also be performed by a UE, for example, to mitigate interference with a potentially interfering UE in its proximity when performing peer-to-peer (P2P) operations with another UE.

Figure 3:
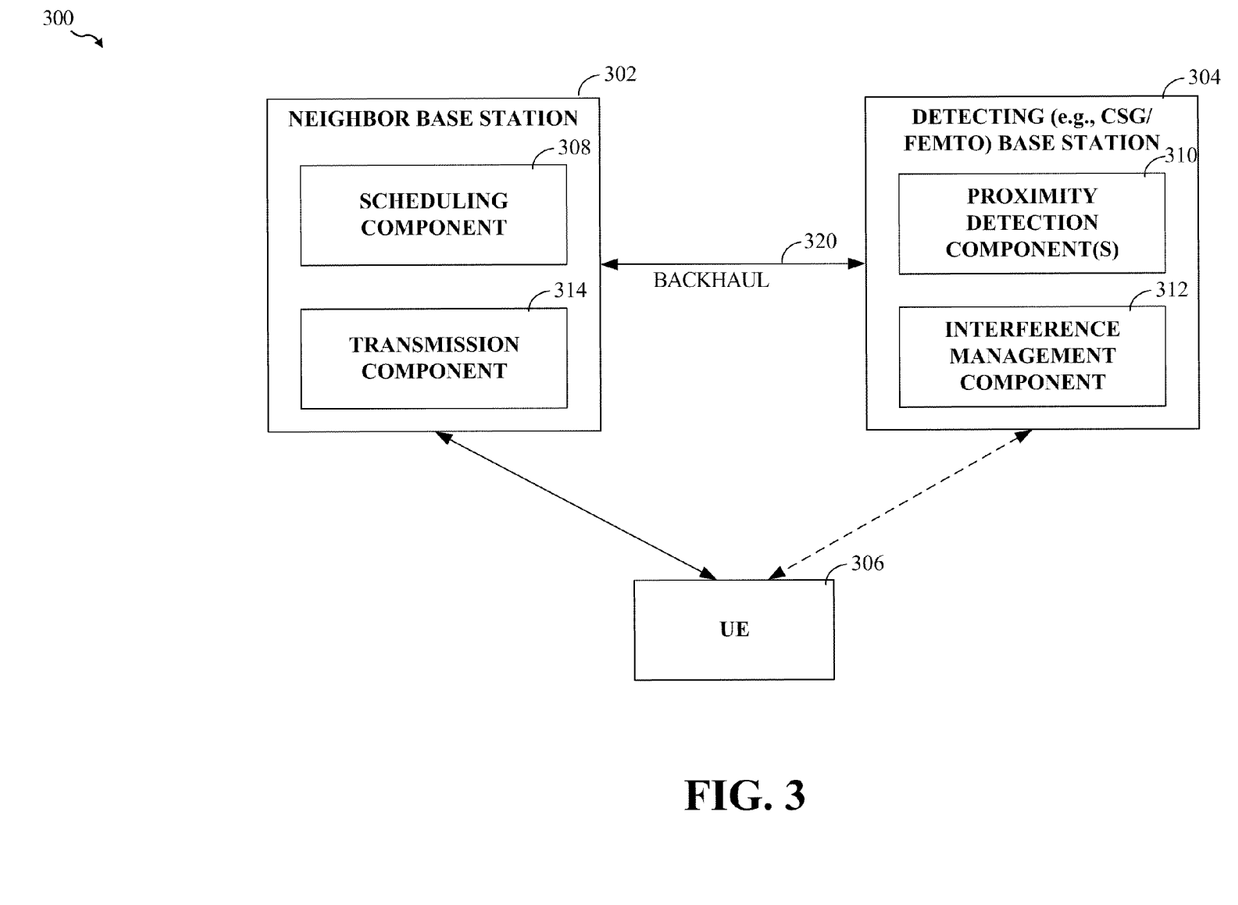
FIG. 3 illustrates example components of a wireless communication system, in accordance with certain aspects of the present disclosure.

FIG. 3 illustrates an example communication system 300 capable of mitigating interference through detection of a potentially interfering UE. In the illustrated example, UE 306 is in proximity to, but not connected to, a base station 304. As with FIG. 1, potentially interfering transmissions are indicated with a dashed line.

As illustrated, system 300 includes the BS 304 and a neighbor base station 302 of a first cell (e.g., a relatively distant base station serving the potentially interfering UE 306). The base stations 302/304 and UE 306 may operate in a similar manner to the base stations and UEs described in connection with FIGS. 1-2.

System 300 may be a heterogeneous network, in which different power classes of nodes (e.g., base stations such as neighbor base station 302 and detecting based station 304) co-exist. In such systems, UEs (e.g., UE 306 or disparate UE not shown) may observe strong interference in the downlink from nodes from different power class cells. As described above, in a closed-subscriber-group (CSG) cell, a Macro UE may not allowed to access the CSG cell, but if the macro UE is in proximity to the CSG BS, uplink transmissions from the Macro UE may be a potential dominant interferer.

According to certain aspects, for multi-carrier operation, the base station 304 may include one or more proximity detection components 310 configured to detect the presence of the UE 306. As will be described in greater detail below, different techniques may be employed for detection of the UE 306. Thus, in some cases, multiple detection components 310 may operate in parallel using different techniques, which may help improve detection. In some cases, the detection output of the various components utilizing different techniques may be considered together (e.g., "XOR'd" or weighted in some way) to make a final decision.

In any case, if a potentially interfering UE is detected, this information may be passed to an interference management component 312 that may take action (e.g., controlling downlink transmissions in an effort to mitigate interference with uplink transmissions form the potentially interfering UE).

In some cases, the detecting BS 304 may listen for transmissions from the neighbor BS 302 and use this information to assist in detecting the proximity of the UE 306. For example, the detecting BS 304 may monitor transmissions from a transmitting component 314 of the BS 302 (with characteristics of the transmissions determined by a scheduling component 308) to gather information regarding UEs in its vicinity as well as the radio frame transmission timing. The detecting BS 304 may then apply some of the detection schemes discussed below only in the symbols and/or subframes where a particular transmission (e.g., DMRS) from the neighbor cells UE is expected. This may help improve performance, for example, by reducing false alarm rates.

The detecting BS 304 may also read System Information Block (SIB) information, monitor typical scheduling decisions of the neighbor base station 302 (made by the scheduling component 308). This may also limit the number of possible sequences that the detecting BS needs to process and, thus, may also improve performance.

Figure 4:
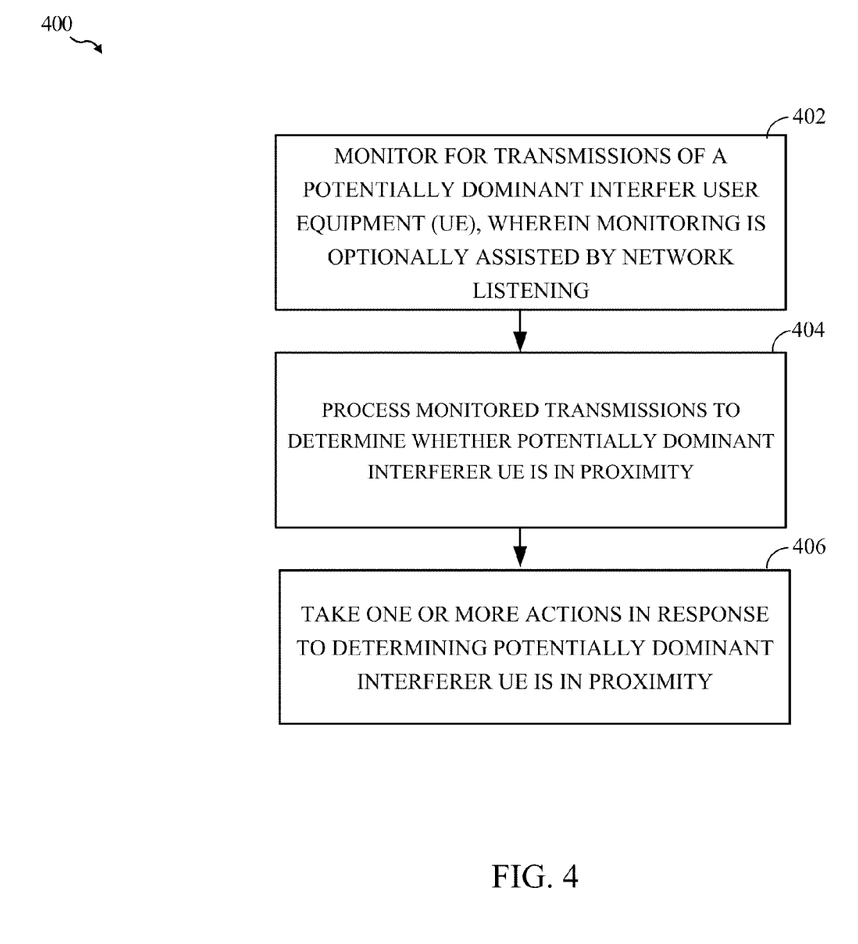
FIG. 4 illustrates example operations for allocating resources, in accordance with certain aspects of the present disclosure.

FIG. 4 illustrates example operations 400 that may be performed, for example, by a detecting BS 304 (or UE acting in P2P mode), for detecting proximity of a potentially interfering UE, in accordance with certain aspects of the present disclosure. A base station or UE performing these operations may be as described in connection with any of FIGS. 1-3. For instance, exemplary operations 400 may be directed by one or more processors (such as processors 230 or 270), or by one or more components (such as component 310).

The operations 400 begin, at 402, by monitoring for transmissions of a potentially dominant interferer user equipment (UE), wherein monitoring is optionally assisted by network listening. As noted above, transmissions from a neighbor BS may be monitored to gather information regarding potentially interfering UEs in the vicinity as well as the radio frame transmission timing. The detecting entity (e.g., BS or UE) may then focus one or more of the detection schemes discussed below in the symbols and/or subframes where a particular transmission from a potentially interfering UE is expected.

At 404, the monitored transmissions are processed to determine whether potentially dominant interferer UE is in proximity. At 406, one or more actions are taken in response to determining a potentially dominant interferer UE is in proximity.

In general, it is desirable if the detecting entity (e.g., CSG eNB or P2P UE) can detect any transmission from a close-by UE. Such transmissions may be categorized, for example, as PUSCH transmissions (e.g., including PUSCH data and/or PUSCH demodulation reference signal "DM-RS") or PUCCH transmissions (e.g., including PUCCH data, PUCCH DM-RS, SRS, or physical random access channel (PRACH). It may be noted that PUSCH transmissions may be of variable bandwidth, which may make their detection more difficult than PUCCH transmissions. In addition, the transmission may be relatively sparse in time.

In general, however, the techniques described herein may be applied in an effort, not necessarily to distinguish UL transmission from thermal noise, but rather to distinguish a single dominant transmission from a combination (e.g., a summed signal) of some non-dominant transmissions and noise.

As noted above, various techniques may be employed to detect whether a potentially interfering UE is in proximity. In some cases, the potentially interfering UE may even assist. As an example, this technique might assume that the UE may transmit a PRACH or other type of signal directed to the CSG eNB (or other detecting entity) upon detecting the proximity of the CSG eNB. This technique may require a change to existing UEs.

Power detection represents another technique that a detecting entity may employ, that might not require a change to existing UEs to detect their proximity. As an example, an eNB may detect a power spectrum density (PSD) at the receiver FFT output.

Such a PSD may naturally vary, depending on neighbor cell scheduling of UE transmissions, resulting in a certain statistical distribution both in frequency and in time. The eNB may then account for (e.g., subtract out) transmissions scheduled by itself to improve the estimate. Alternately, the eNB may not schedule transmissions in some resources (e.g. PUCCH RBs) and can use those resources to estimate the power of transmission from UEs connected to neighboring eNBs.

The presence of a nearby dominant interferer may be indicated by a relatively high PSD in certain time and frequency positions. This may be detected by PSD thresholding or other appropriate methods. In some cases, setting of a threshold may be aided by the eNBs knowledge of the pathloss to other eNBs. This may provide a baseline estimate of expected UE transmission powers directed to those other eNBs. Lacking knowledge of power control issued by other eNBs, this estimate may not be precise, but it may still be useful.

PRACH detection represents another technique that a detecting entity may employ for proximity detection. UEs have to transmit PRACH at various times, for example, in order to re-establish connection after a long idle period, for handovers, and at initial connection. In addition, in a network with CSG deployments, the UE may be requested to transmit PRACH for proximity detection purposes as well.

If a CSG eNB knows the access parameters used by neighbor base stations then it may be able to follow the same PRACH detection algorithm utilized by the neighbor base stations. If the CSG cell is well within the coverage of one neighbor base station (e.g., macro), and not in a handover region, then it may suffices to detect PRACH directed only to that macro base station.

If access parameter information for neighbor cells is not available, then a CSG eNB may search for all possible configurations. However, this may be relatively complex and time-consuming.

Alternatively, the CSG cell may use a Chu sequence detection method described below, since the PRACH preamble is also a Chu sequence. For this technique, for example, a CSG cell may try to detect each of the possible preamble formats (e.g., four are defined in LTE), or just the one known to be used in neighbor cells, when at least that information is available. The assumed sequence length may depend on the preamble format.

DM-RS sequences are typically extended Chu sequences, which may be treated as Chu sequences for the purposes of the following description. The technique may take advantage of the known property of Chu sequences, that cyclic shifts in the time domain are equivalent of frequency shifts. Therefore, the element-wise product of a Chu-sequence and the complex conjugate of its cyclic shift is a constant frequency rotating sequence which may be readily detected by a DFT operation. This may be expressed in more details as follows.

It may be assumed that $r(k)$, $k=0, 1, \ldots, N-1$ is the sequence of received samples. N may be chosen so that the length of $r(k)$ is approximately the SC-FDM symbol length. For example, with 30.72 MHz sampling rate, N may be chosen to be 2048. If the neighbor cells are known to be not synchronized, then it may be beneficial to use N somewhat less than 2048.

Next, a shift value of m may be selected. The shift value may be selected so that it sufficiently decorrelates the received signal, for example, even for low bandwidth transmissions. For a 30.72 MHz sampling rate, this may give a constraint of $m \geq \lceil 2048/12 \rceil = 171$. Due to possible zero padding, choosing the smallest possible m satisfying the above constraint may prove beneficial.

An element-wise product sequence $s(k)$ may be calculated, for example, by either of the following methods. For a non-Cyclic shift:

$$s(k) = r(k) \cdot r(k+m)^*$$

For a Cyclic shift:

$$s(k) = r(k) \cdot r((k+m) \bmod N)^*$$

With Zero padding:

$$\begin{cases} 0 \leq k < N-m & s(k) = r(k) \cdot r(k+m)^* \\ N-m \leq k < N & s(k) = 0 \end{cases}$$

It may be noted that in synchronous systems, choosing N equal to a symbol length and using cyclic shift may be preferred. For asynchronous systems, choosing N less than the symbol length and using a non-cyclic shift may be beneficial. The zero padding method may represent a compromise solution that may work in either synchronous or asynchronous systems.

In any case, the detector may then determine the DFT peak as $S=\max_f(|DFT\{s(k)\}|)$ or $S=\max_f(|DFT\{s(k)\}|^2)$. The DFT size may be any length larger than or equal to N. For example, a with 30.72 MHz sampling rate, the DFT size can be chosen to be 2048.

SRS detection represents another technique that a detecting entity may employ for proximity detection. The SRS detection may be similar to the DM-RS detection described above, but with parameters optimized for SRS. For example, N may be chosen as half the SC-FDM symbol length and the cyclic shift method may be selected.

PUCCH detection represents another technique that a detecting entity may employ for proximity detection. The PUCCH transmission does not use a Chu-sequence for DM-RS, so a different detection method may be required. However, the feature that each PUCCH symbol in a slot is a cyclic shift and modulated version of the same sequence may be exploited for detection purposes. So, if a received signal is divided into symbols, the absolute cross-correlation across symbols may be calculated. Then, a burst of six peaks may be taken as an indication of the presence of a PUCCH slot. As an alternative, a group of two such bursts may be taken as an indication that a PUCCH subframe is present.

One possible implementation of such a cross-correlation detector is as follows. It may be assumed that r(k), k=0, 1, ..., N−1 is the sequence of received samples. N may be chosen so that the length of r(k) is approximately the SC-FDM symbol length. For example, with a 30.72 MHz sampling rate, N may be chosen to be 2048. If the neighbor cells are known to be not synchronized then it may be beneficial to use N somewhat less than 2048. Next, a time shift value m may be chosen so that it corresponds to an SC-FDM symbol plus cyclic prefix (CP). The Fourier transforms $R_0(f)=DFT\{r(k)\}$ and $R_1(f)=DFT\{r(k+m)\}$ may then be calculated, and also the frequency domain element-wise product sequence S(f) as $S(f)=R_0(f) \cdot R_1(f)^*$. The autocorrelation peak may be found as $S=\max(|DFT\{S(f)\}|)$ or $S=\max(|DFT\{S(f)\}|^2)$.

The DFT size may be any length larger than or equal to N, for example, with 30.72 MHz sampling rate, the DFT size can be chosen to be 2048. The resulting peak values may be filtered, for example, by summing the results for 6 or 13 consecutive symbols. The above method may be relatively straightforward for synchronous macro and CSG cells.

For the asynchronous case, the following methods are possible. First, two (or more) correlators may be used, for example, running at half-symbol (or less) time offsets relative to each other. The correlator that is more closely aligned with the UE transmit symbol timing may give higher output. Second, a single correlator may be used, but with double the FFT length, for example, with an FFT length equivalent to two SC-FDM symbols. Both solutions may have some SNR loss, but for a strong dominant interferer UE, that may be tolerable and result in acceptable detection.

Figure 5:
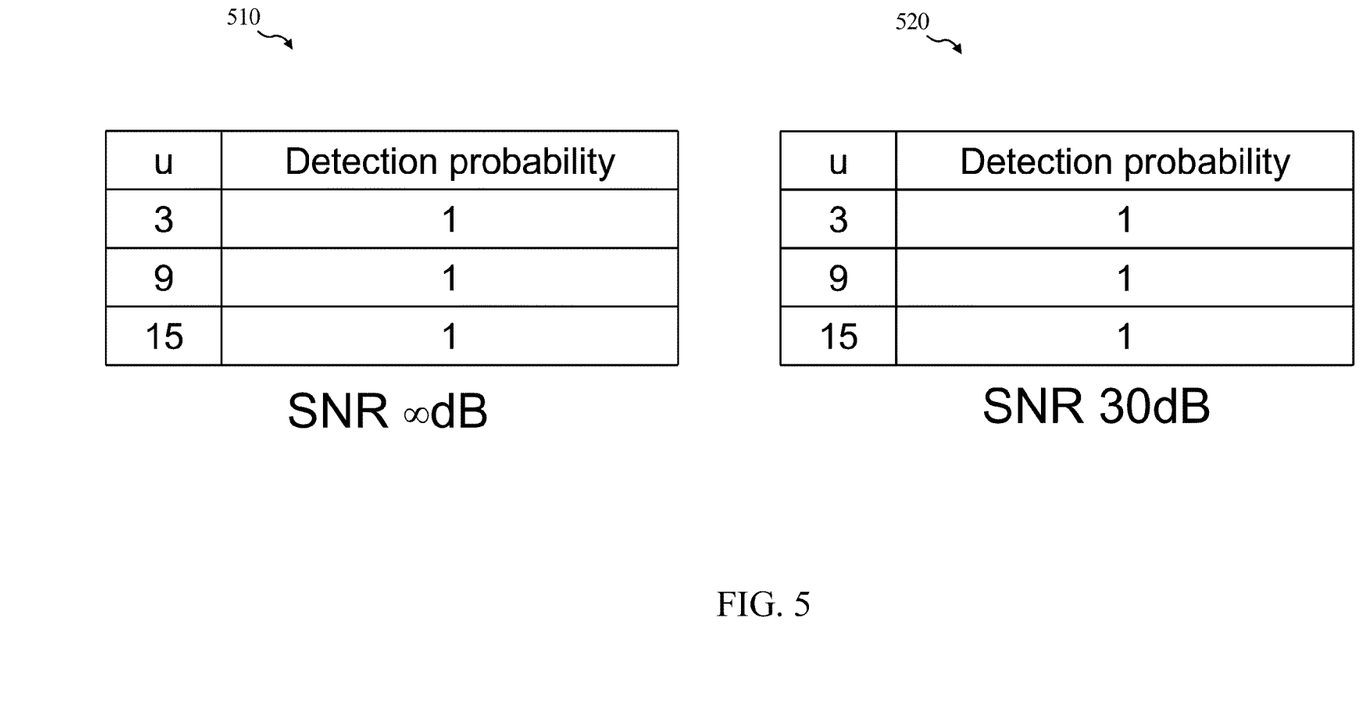
FIG. 5 illustrates example simulated detection results, in accordance with certain aspects of the present disclosure.

The proximity detection techniques provide herein may result in relatively reliable detection. For example, FIG. 5 illustrates example simulation results, assuming LTE transmission parameters of 50 RBs (10 MHz system bandwidth). In this example, a detection threshold may be computed by inputting random QPSK data occupying 50 RBs at 30 dB SNR in an AWGN channel, with a Probability of False Alarm (PFA) set to 0.1% and DM-RS sequences occupying 50 RBS, with an AWGN channel and no fading. As illustrated, by tables 510 and 520, detection performance utilizing the techniques presented herein with an SNR of 30 dB may be as strong as with a perfect channel (assuming no noise).

Once proximity is detected (regardless of how it is detected), various actions may be taken, based on results of the proximity detection, in an effort to mitigate interference with the detected UE.

As one example, a detecting cell may invoke and/or disable downlink power control based on the presence of a macro UE. In some cases, a detecting cell may turn on or turn off DL transmissions in the detected presence of a CSG candidate. In some cases, a detecting cell may send a UL interference control message to a macro cell. In this case, the message may contain an identity of the detected UE, which may be readily obtained via some of the detection techniques described above.

As described herein, certain aspects provide techniques to detect transmission from UEs whose signal may be result in dominant interference, but whose signal may not be transmitted continuously. The techniques presented herein cover a wide variety of possible transmission formats, with particular optimizations provided for SRS, PUCCH, PRACH and DM-RS (for PUSCH) detection as non-limiting examples. Further, the techniques described herein may be performed by base stations (e.g., CSG eNBS or P2P UEs).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
monitoring for transmissions of a potentially dominant interferer user equipment (UE);
processing the monitored transmissions comprising detecting power spectrum density (PSD) at a receiver and determining whether a potentially dominant interferer UE is in proximity based on peaks of the PSD being above threshold amounts; and
taking one or more actions in response to determining a potentially dominant interferer UE is in proximity.

2. The method of claim 1, wherein:
monitoring for transmissions of the potentially dominant interferer UE comprises monitoring for a physical random access channel (PRACH); and
processing the monitored transmissions to determine whether potentially dominant interferer UE is in proximity is based on known access parameters of a neighbor base station serving the potentially dominant interferer UE.

3. The method of claim 1, wherein:
monitoring for transmissions of the potentially dominant interferer UE comprises monitoring for a physical uplink control channel (PUCCH); and
processing the monitored transmissions comprises determining at least one autocorrelation peak.

4. The method of claim 1, wherein monitoring for transmissions of the potentially dominant interferer UE comprises:
monitoring for at least one of a demodulation reference signal (DM-RS) and a sounding reference signal (SRS).

5. The method of claim 1, wherein monitoring for transmissions of the potentially dominant interferer UE comprises:
monitoring for a transmission directed to a close subscriber group (CSG) of which the potentially dominant interferer UE is not a member of the CSG.

6. The method of claim 1, wherein the one or more actions comprise:
invoking downlink power control, in response to detecting the presence of the potentially dominant interferer UE.

7. The method of claim 1, wherein the one or more actions comprise:
transmitting a control message to a base station serving the potentially dominant interferer UE.

8. The method of claim 3, wherein determining at least one autocorrelation peak comprises detecting at least one burst of at least six peaks.

9. The method of claim 5, further comprising:
transmitting a request to the potentially dominant interferer UE to request the transmission directed to the CSG.

10. A method for wireless communications, comprising:
monitoring for transmissions of a potentially dominant interferer user equipment (UE) comprising monitoring for a physical random access channel;
processing the monitored transmissions to determine whether a potentially dominant interferer UE is in proximity, wherein the processing is based on known access parameters of a neighbor base station serving the potentially dominant interferer UE and comprises performing detection of a Chu sequence by performing an element-wise product of a sequence of samples and a complex conjugate of a cyclic shift of the sequence; and
taking one or more actions in response to determining a potentially dominant interferer UE is in proximity.

11. A method for wireless communications, comprising:
monitoring for transmissions of a potentially dominant interferer user equipment (UE) comprising monitoring for at least one of a demodulation reference signal (DM-RS) and a sounding reference signal (SRS);
processing the monitored transmissions to determine whether a potentially dominant interferer UE is in proximity, wherein the processing comprises performing detection of a Chu sequence by performing an element-wise product of a sequence of samples and a complex conjugate of a cyclic shift of the sequence; and
taking one or more actions in response to determining a potentially dominant interferer UE is in proximity.

12. An apparatus for wireless communications, comprising:
means for monitoring for transmissions of a potentially dominant interferer user equipment (UE);
means for processing the monitored transmissions comprising means for detecting power spectrum density (PSD) at a receiver;
means for determining whether a potentially dominant interferer UE is in proximity comprising means for performing processing based on peaks of the PSD being above threshold amounts; and
means for taking one or more actions in response to determining a potentially dominant interferer UE is in proximity.

13. The apparatus of claim 12, wherein:
the means for monitoring for transmissions of the potentially dominant interferer UE comprises means for monitoring for a physical random access channel (PRACH); and
the means for processing the monitored transmissions performs processing based on known access parameters of a neighbor base station serving the potentially dominant interferer UE.

14. The apparatus of claim 12, wherein:
the means for monitoring for transmissions of the potentially dominant interferer UE comprises means for monitoring for a physical uplink control channel (PUCCH); and
the means for processing the monitored transmissions comprises means for determining at least one autocorrelation peak.

15. The apparatus of claim 12, wherein the means for monitoring for transmissions of the potentially dominant interferer UE comprises:
means for monitoring for at least one of a demodulation reference signal (DM-RS) and a sounding reference signal (SRS).

16. The apparatus of claim 12, wherein the means for monitoring for transmissions of the potentially dominant interferer UE comprises:
means for monitoring for a transmission directed to a close subscriber group (CSG) of which the potentially dominant interferer UE is not a member of the CSG.

17. The apparatus of claim 12, wherein the one or more actions comprise:
invoking downlink power control, in response to detecting the presence of the potentially dominant interferer UE.

18. The apparatus of claim 12, wherein the one or more actions comprise:
transmitting a control message to a base station serving the potentially dominant interferer UE.

19. The apparatus of claim 14, wherein the means for determining at least one autocorrelation peak comprises means for detecting at least one burst of at least six peaks.

20. The apparatus of claim 16, further comprising:
means for transmitting a request to the potentially dominant interferer UE to request the transmission directed to the CSG.

21. An apparatus for wireless communications, comprising:
means for monitoring for transmissions of a potentially dominant interferer user equipment (UE) comprising means for monitoring for a physical random access channel (PRACH);
means for processing the monitored transmissions to determine whether potentially dominant interferer UE is in proximity, wherein the means for processing comprises means for performing processing based on known access parameters of a neighbor base station serving the potentially dominant interferer UE and means for performing detection of a Chu sequence by performing an element-wise product of a sequence of samples and a complex conjugate of a cyclic shift of the sequence; and
means for taking one or more actions in response to determining a potentially dominant interferer UE is in proximity.

22. An apparatus for wireless communications, comprising:
means for monitoring for transmissions of a potentially dominant interferer user equipment (UE) comprising means for monitoring for at least one of a demodulation reference signal (DM-RS) and a sounding reference signal (SRS);
means for processing the monitored transmissions to determine whether potentially dominant interferer UE is in proximity, wherein the means for processing comprises means for performing detection of a Chu sequence by performing an element-wise product of a sequence of samples and a complex conjugate of a cyclic shift of the sequence; and
means for taking one or more actions in response to determining a potentially dominant interferer UE is in proximity.

23. An apparatus for wireless communications, comprising:
at least one processor configured to:
monitor for transmissions of a potentially dominant interferer user equipment (UE), process the monitored transmissions to determine whether potentially dominant interferer UE is in proximity, and take one or more actions in response to determining a potentially dominant interferer UE is in proximity, wherein processing the monitored transmissions to determine whether a potentially dominant interferer UE is in proximity comprises detecting power spectrum density (PSD) at a receiver and determining whether a potentially dominant interferer UE is in proximity based on peaks of the PSD being above threshold amounts; and
a memory coupled with the at least one processor.

24. The apparatus of claim 23, wherein: the at least one processor is further configured to:
monitor for a physical random access channel (PRACH), and
process the monitored transmissions based on known access parameters of a neighbor base station serving the potentially dominant interferer UE.

25. The apparatus of claim 23, wherein the at least one processor is further configured to:
monitor for a physical uplink control channel (PUCCH), and
determine at least one autocorrelation peak.

26. The apparatus of claim 25, wherein the at least one processor is configured to determine the at least one autocorrelation peak by detecting at least one burst of at least six peaks.

27. The apparatus of claim 23, wherein the at least one processor is further configured to monitor for at least one of a demodulation reference signal (DM-RS) and a sounding reference signal (SRS).

28. The apparatus of claim 23, wherein the at least one processor is further configured to monitor for a transmission directed to a close subscriber group (CSG) of which the potentially dominant interferer UE is not a member of the CSG.

29. The apparatus of claim 23, wherein the one or more actions comprise:
invoking downlink power control, in response to detecting the presence of the potentially dominant interferer UE.

30. The apparatus of claim 23, wherein the one or more actions comprise:
transmitting a control message to a base station serving the potentially dominant interferer UE.

31. The apparatus of claim 28, wherein the at least one processor is further configured to transmit a request to the potentially dominant interferer UE to request the transmission directed to the CSG.

32. A computer-program product comprising a non-transitory computer-readable medium with instructions stored thereon, the instructions executable by a processor for:
monitoring for transmissions of a potentially dominant interferer user equipment (UE);
processing the monitored transmissions comprising detecting power spectrum density (PSD) at a receiver and determining whether a potentially dominant interferer UE is in proximity based on peaks of the PSD being above threshold amounts; and taking one or more actions in response to determining a potentially dominant interferer UE is in proximity.

* * * * *